United States Patent [19]
Mitchell

[11] 3,730,307
[45] May 1, 1973

[54] HYDRAULIC BRAKE SYSTEM BLEEDER

[75] Inventor: Wallace F. Mitchell, Arlington Heights, Ill.

[73] Assignee: Ammco Tools Inc., Chicago, Ill.

[22] Filed: Oct. 4, 1971

[21] Appl. No.: 186,320

[52] U.S. Cl. ..............................188/352, 220/85 B
[51] Int. Cl. .............................................B60t 17/00
[58] Field of Search....................188/352; 220/85 A, 220/85 B, 63, 65; 222/386.5

[56] References Cited
UNITED STATES PATENTS

| 2,735,589 | 2/1956 | Milster et al.............188/352 X |
| 2,299,611 | 10/1942 | Clark..........................220/85 B |

Primary Examiner—Allen N. Knowles
Assistant Examiner—Gene A. Church
Attorney—Fidler, Patnaude & Batz

[57] ABSTRACT

A portable, pressurizable brake bleeder includes a spherical pressure tank formed of a pair of identical castings each lined with a removable sealing member, and a flexible diaphragm of hemispherical shape dividing the tank into a brake fluid reservoir and an air chamber.

6 Claims, 3 Drawing Figures

Patented May 1, 1973

HYDRAULIC BRAKE SYSTEM BLEEDER

The present invention generally relates to a device for use in supplying hydraulic fluid under pressure to a hydraulic system, and it relates more particularly to a portable brake bleeder employing a pair of identical castings and a pair of identical liners interconnected to provide a pressurizable spherical tank.

BACKGROUND OF THE INVENTION

Pressurized brake bleeders of the general type to which the present invention relates ordinarily comprise a pressure tank separated by an impervious, resilient diaphragm into an air chamber and a brake fluid chamber. Where, however, the tank is formed of two or more metal castings, difficulties caused by penetration of the brake fluid into and through the castings are commonplace. Attempts to solve this problem have been unsuccessful because of the increased manufacturing cost required to build the modified designs. Another problem common to the prior art bleeders has been leakage between the two chambers when the diaphragm is stretched.

OBJECTS OF THE INVENTION

The principal object of the present invention is, therefore, to provide a new and improved brake bleeder construction.

Another object of this invention is to provide a novel brake bleeder which is not susceptible to the problems of the prior art devices mentioned hereinabove and which can be manufactured at a cost comparable to that of the prior art brake bleeders.

A further object of this invention is to provide a novel brake bleeder including a diaphragm which is not stretched during use.

A still further object of this invention is to provide novel means for lining a pressure tank.

SUMMARY OF THE INVENTION

Briefly, the above and further objects may be realized in accordance with the present invention by providing a pair of identical, hemispherical castings each having a pair of diametrically opposed ports therein, and a pair of identical, flexible, hemispherical liners each having neck portions extendable through said ports, and further having annular flanges which fit between corresponding flanges on the castings on opposite sides of a circular flange on a hemispherical, flexible diaphragm to seal the diaphragm in place between the castings. The ends of the neck portions are disposed between the edges of the ports and fittings attached thereto to provide hermetic seals around the port areas.

BRIEF DESCRIPTION OF THE DRAWING

The above and further objects and a better understanding of the invention may be had from the following detailed description taken in connection with the accompanying drawing, wherein.

Figure 1:
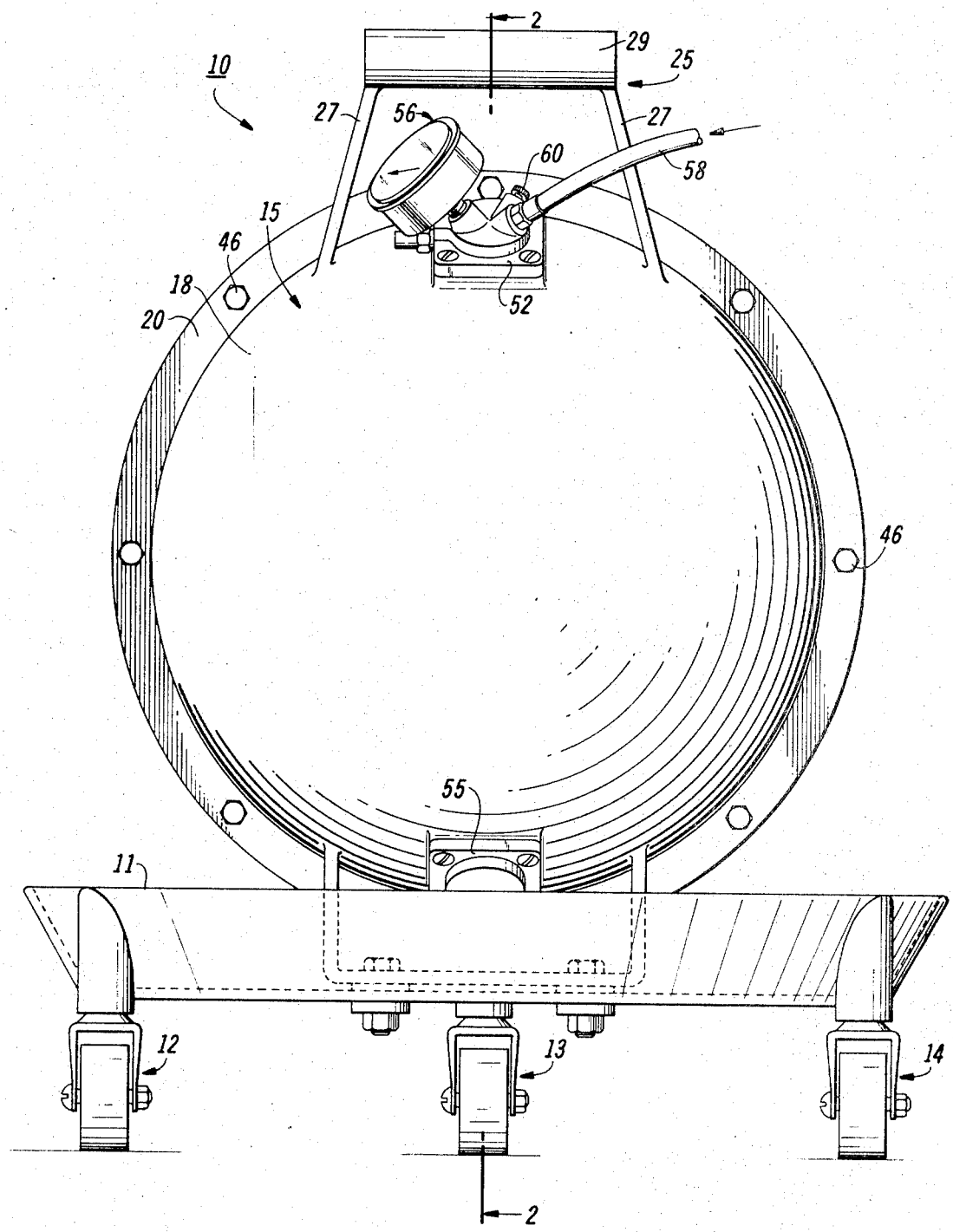
FIG. 1 is an elevational view of a brake bleeder embodying the present invention.
Figure 2:
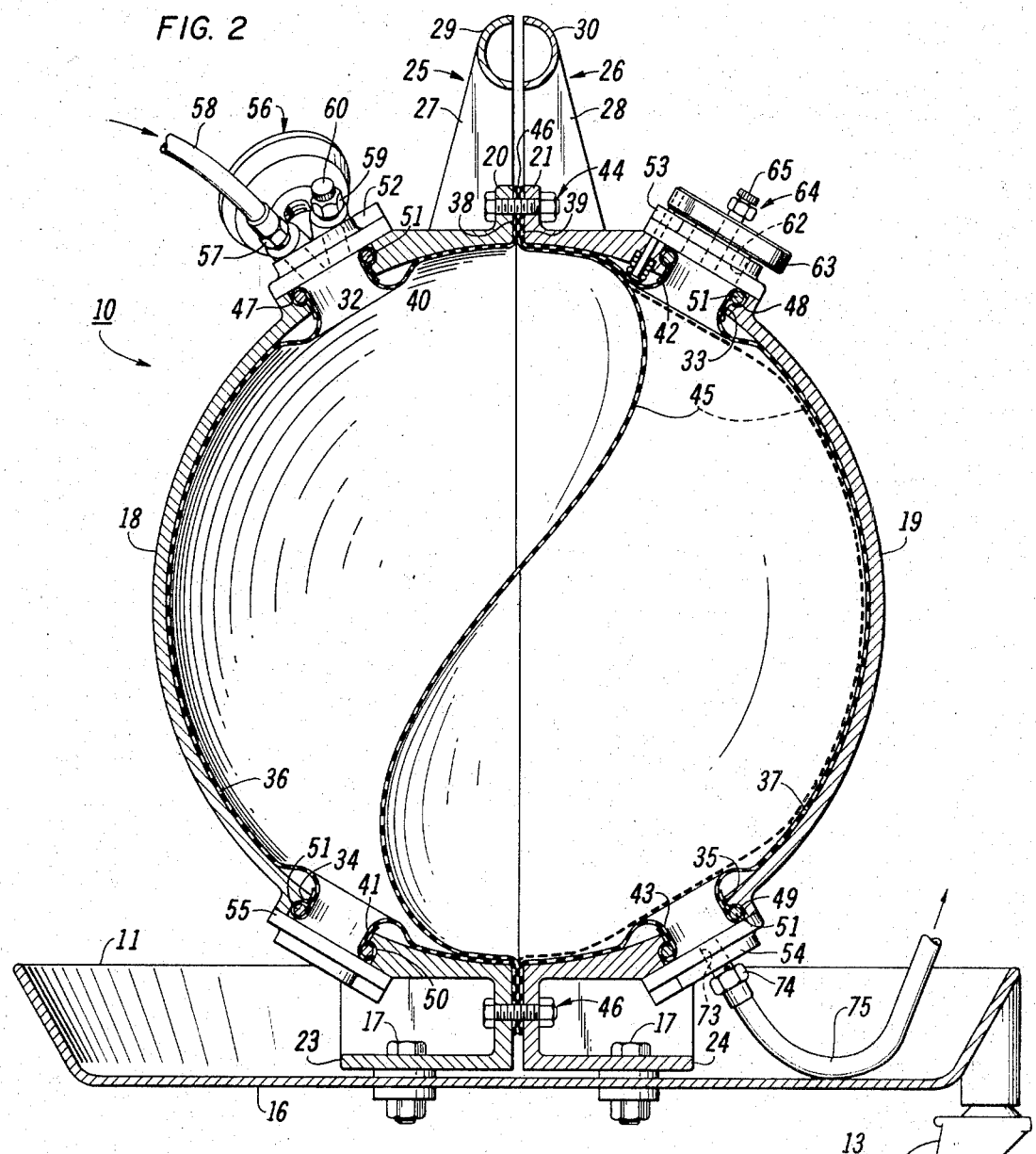
FIG. 2 is a vertical section taken along the line 2—2 of FIG. 1.

Referring now to the drawing and particularly to FIGS. 1 and 2 thereof, a pressurizable brake bleeder 10 comprises a base member and tray 11 supported on three casters 12, 13, and 14, and a spherical tank 15 mounted on and fastened to the bottom wall 16 of the tray 11 by a plurality of nut and bolt assemblies 17.

The tank 15 includes a pair of identical, generally hemispherical castings 18 and 19 having annular, peripheral edge flanges 20 and 21. The flanges 20 and 21 are wider at the bottom, and integral mounting flanges 23 and 24 extend therefrom and are apertured to receive the bolts 17.

Extending upwardly from the castings 18 and 19 and forming an integral part thereof is a pair of handle portions 25 and 26 including a pair of upstanding sidewalls 27 and 28 and semicylindrical handgrip portions 29 and 30 extending between the distal ends of the sidewalls 27 and 28. It may be seen that the semicylindrical portions 29 and 30 provide, in the assembled brake bleeder, a generally cylindrical handle facilitating movement of the brake bleeder to the desired location.

The castings 18 and 19 are provided with upper ports 32 and 33 and with lower ports 34 and 35. A pair of identical flexible liners 36 and 37 formed of any suitable material which is impervious to the brake fluid, such as rubber, are respectively disposed in each of the castings 18 and 19 and respectively include annular edge flanges 38 and 39. The liners 36 and 37 are symmetrical and respectively include neck portions 40 and 41, and 42 and 43. Therefore, when assembling the liner 36 in the casting 18, for example, the necks 40 or 41 can be placed in either of the ports 32 and 34. Mounted between the flanges 38 and 39 and dividing the tank into two hermetically separated chambers is a hemispherically shaped imperforate, flexible member 45 which may also be formed of rubber. The member 45 functions like a diaphragm and has an annular peripheral flange 44 sealably secured between the castings 18 and 19 by means of a plurality of nut and bolt assemblies 46 which extend through aligned openings in the flanges 20 and 21 and are used to compress the flanges 38 and 39 of the liner tightly against the opposite faces of the peripheral edge flange 44 of the diaphragm 45. Annular grooves or counterbores surround the outer ends of the ports 32–35 and theses grooves are identified in the drawing as 47, 48, 49 and 50. The neck portions of the liners are folded back over rigid rings 51 conveniently formed of metal located within the grooves 47–50, and a plurality of mounting plates 52, 53, 54 and 55 are bolted onto the castings 18 and 19 over the ports to compress the portions of the necks surrounding the rings 51, thereby to provide sealing rings which seal the mounting plates to the casting. The plates 52–55 all have the same basic shape and may be cast in the same mold.

Connected to the mounting plate 52 is a pressure indicator 56, an inlet connector 57 adapted to be connected by means of a flexible hose 58 to a source of compressed air, and an air bleed valve 59 including a thumb screw 60 which may be rotated to release the air pressure from within the chamber formed by the liner 36 and the diaphragm 45.

The plate 54 at the bottom of the air chamber is not apertured thereby to sealably close the lower port 34. The plate 54, like the other similar plates, is bolted to the housing and may be removed to clean out the associated chamber by removing any sediment or the like which may collect therein.

Figure 3:
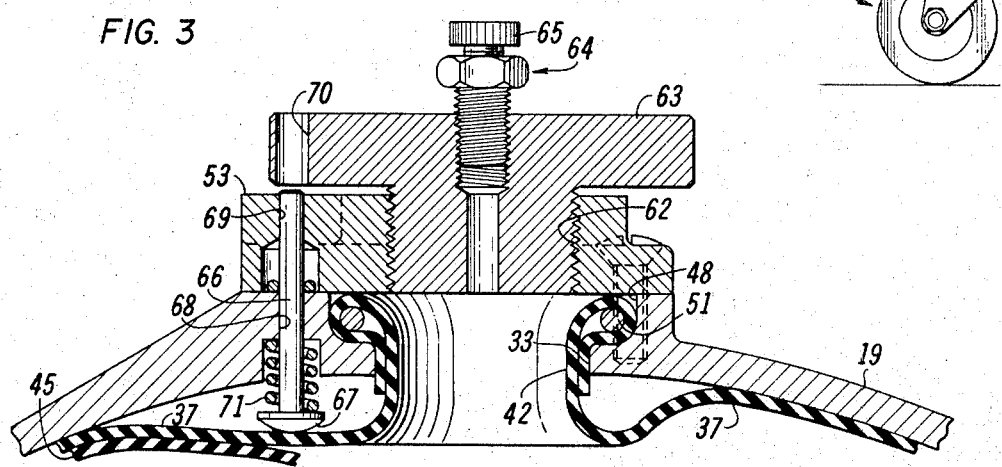
FIG. 3 is an enlarged cross-sectional view of the fluid inlet port used for supplying hydraulic fluid to the bleeder.

The mounting plate 53 is provided with a threaded center bore 62 for receiving a removable cap 63 provided at its center with a bleed valve 64 operated by a thumb screw 65 (best shown in FIG. 3). The cap 63 is removed in order to fill the chamber defined by the liner 37 and the member 45 with the hydraulic fluid. In order to prevent the opening of the cover 33 while the tank is pressurized, a safety locking pin 66 having a head 67 located within the tank is slidably mounted in aligned bores 68 and 69 in the casting 19 and in the mounting plate 53. A hole 70 is drilled in the cap 63 so that when the pressure within the tank exceeds atmospheric pressure by a predetermined amount, the liners 45 and 37 acting against the head 67 forces the pin 66 into the hole 70 to prevent rotation of the cap 63. It may be seen that several turns of the cap 63 are required to remove it from the mounting plate 53 and, therefore, even though the pin 69 may not be initially aligned with the bore 70, as the cap 63 is turned and the bore 70 moves into alignment with the pin 66, the pin will be moved into the bore 70 thereby preventing further rotation of the cap 63 until the pressure has been relieved. When the pressure has been relieved, a coil spring 71 surrounding the pin 66 and mounted in a counterbore under the head 67 forces the pin downwardly out of the opening 70 whereby the cap 63 may be readily removed.

The mounting plate 54 is provided with a threaded bore 73 for receiving a fitting 74 which connects to a flexible hose 75 for carrying the hydraulic fluid from the brake meter 10 to the master cylinder or other location in the hydraulic system to which the pressurized brake fluid is to be supplied. Ordinarily the distal end of the hose 75 is provided with a quick disconnect coupling including a valve which automatically closes when the coupling is disconnected.

In use, with the distal end of the hose 75 closed, the cap 63 is removed and the chamber defined by the liner 37 and the diaphragm 45 are filled with brake fluid. Because of the hemispherical shape of the diaphragm 45, substantially the entire tank may be filled if desired. The cap 63 is then closed and compressed air is supplied through the line 58 to the chamber defined by the liner 36 and the diaphragm 45. The pressure indicator indicates the pressure within the tank. The hose 75 may now be connected to the master cylinder, for example, or other location in the brake system to feed brake fluid under pressure to the brake system. Initially when the unit is filled with hydraulic fluid, the diaphragm 45 is located primarily within the casting 18 and moves towards and into the casting 19 as the fluid is used up. Since the diaphragm 45 is of the same basic size and shape as the liners 36 and 37, it never stretches. Moreover, the pressure differential across the diaphragm is substantially zero at all times whereby the leakage problems associated with the prior art brake bleeders are obviated.

As shown in phantom in FIG. 1, as the hydraulic fluid is used up, the diaphragm 45 moves into the casting 19 and closes the outlet port shortly before the hydraulic fluid is completely exhausted thereby preventing the flow of air into the hose 75 and thus into the brake system.

It may thus be seen that the brake bleeder of the present invention is relatively simple in construction whereby the manufacturing cost is relatively low. Nevertheless, seepage of the brake fluid through the casting 19 is prevented, leakage between the two chambers is minimized and the various parts of the brake bleeder may be easily and quickly replaced should they become damaged or deteriorated. Moreover, no particular skill is required to change the liners or the diaphragm, nor are there many small parts such as O-rings which may be lost or damaged during such disassembly and assembly.

While the present invention has been described in connection with a particular embodiment thereof, it will be understood that those skilled in the art may make many changes and modifications without departing from the true spirit and scope thereof. Accordingly, the appended claims are intended to cover all such changes and modifications as fall within the true spirit and scope of the present invention.

What is claimed is:

1. A brake bleeder for use with hydraulic brake systems, comprising
    a pair of identical hemispherical members having opposed end flanges,
    a pair of identical, flexible, resilient, imperforate, hemispherical liners respectively disposed in said members and having flanges interposed between said end flanges,
    a flexible, imperforate diaphragm having an annular peripheral flange portion interposed between said flanges on said liners to form two chambers,
    means securing said end flanges together and compressing said diaphragm between said flanges on said liners,
    an air inlet to one of said chambers,
    a hydraulic fluid fill port at the top of the other chamber, and a hydraulic fluid outlet port near the bottom of said other chamber.

2. A brake bleeder according to claim 1 further comprising
    at least one tubular neck portion on each of said liners respectively extending into cylindrical ports in said members.

3. A brake bleeder according to claim 2 wherein each of said members is provided with
    a mounting flange surrounding said port, said flange having an annular groove therein surrounding said port,
    the distal end of said neck portion is folded back on itself within said groove to provide a sealing ring, and
    a member secured to said mounting flange over said opening to compress said folded-back portion of said liner in said groove.

4. A brake bleeder according to claim 3 further comprising
    an annular member over which said distal end is folded back,
    said annular member being disposed in said groove.

5. A brake bleeder according to claim 1 wherein
    said diaphragm overlies said hydraulic fluid outlet port when said other chamber is substantially devoid of hydraulic fluid and said one chamber is pressurized.

6. A brake bleeder according to claim 5 wherein said diaphragm is hemispherically shaped.

* * * * *